(12) United States Patent
Kim

(10) Patent No.: US 7,792,790 B2
(45) Date of Patent: Sep. 7, 2010

(54) SYSTEM AND METHOD OF SYNCHRONIZING DATA BETWEEN A SERVER AND A CLIENT

(75) Inventor: Seong-Eun Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1382 days.

(21) Appl. No.: 10/926,911

(22) Filed: Aug. 26, 2004

(65) Prior Publication Data

US 2005/0198084 A1 Sep. 8, 2005

(30) Foreign Application Priority Data

Mar. 5, 2004 (KR) ...................... 10-2004-0015035

(51) Int. Cl.
  *G06F 17/00* (2006.01)
(52) U.S. Cl. ...................... 707/609; 707/610; 707/612; 707/620; 707/626
(58) Field of Classification Search ...................... 707/8, 707/609, 610, 612, 620, 626, 999.204, 999.203
See application file for complete search history.

(56) References Cited

U.S. PATENT DOCUMENTS

| | | | | |
|---|---|---|---|---|
| 5,926,816 A | * | 7/1999 | Bauer et al. ...................... | 707/8 |
| 6,141,664 A | * | 10/2000 | Boothby ............................. | 1/1 |
| 6,317,754 B1 | * | 11/2001 | Peng ................................. | 1/1 |
| 6,330,568 B1 | * | 12/2001 | Boothby et al. ..................... | 1/1 |
| 6,343,299 B1 | * | 1/2002 | Huang et al. ........................ | 1/1 |
| 6,393,434 B1 | * | 5/2002 | Huang et al. ........................ | 1/1 |
| 6,466,951 B1 | * | 10/2002 | Birkler et al. ...................... | 1/1 |
| 6,516,314 B1 | * | 2/2003 | Birkler et al. ...................... | 1/1 |
| 6,643,669 B1 | * | 11/2003 | Novak et al. ....................... | 1/1 |
| 6,718,348 B1 | * | 4/2004 | Novak et al. ....................... | 1/1 |
| 6,976,038 B2 | * | 12/2005 | Acree et al. ........................ | 1/1 |
| 7,024,430 B1 | * | 4/2006 | Ingraham et al. ................... | 1/1 |
| 7,113,963 B1 | * | 9/2006 | McCaw ............................. | 1/1 |
| 2002/0161735 A1 | * | 10/2002 | Cheng et al. .................... | 707/1 |

* cited by examiner

*Primary Examiner*—Don Wong
*Assistant Examiner*—Thanh-Ha Dang
(74) *Attorney, Agent, or Firm*—The Farrell Law Firm, LLP

(57) ABSTRACT

A data synchronizing method between a server and a client is provided. The server and the client manage database changed after a previous synchronization of data shared by them. The database includes a sync anchor field for each data item. When a sync session is initiated upon request of the client, a last anchor is detected from the database stored in the client and a last anchor from the database stored in the server. The last anchor of the client is compared with the last anchor of the server. A client change log and a server change log are generated according to a comparison result based on a database change that occurred after the last anchor of client or server when the last anchor of the client is identical to the last anchor of the server. The databases are updated according to the client change log and the server change log.

11 Claims, 5 Drawing Sheets

| ITEM ID | DATA FIELD | SYNC ANCHOR |
|---|---|---|
| 1 | | |
| 2 | | |
| 3 | | |
| ... | | |
| n | | |

FIG.2

| ITEM ID | DATA FIELD | | | SYNC ANCHOR |
|---|---|---|---|---|
| 1 | a-1 | b-1 | c-1 | 20031103T101010Z |
| 2 | a-2 | b-2 | c-2 | 20031103T103010Z |
| 3 | a-3 | b-3 | c-3 | 20031103T101010Z |
| 4 | a-4 | b-4 | c-4 | 20031010T101010Z |
| 5 | a-5 | b-5 | c-5 | 20031101T103210Z |

FIG.4A

| ITEM ID | DATA FIELD | | | SYNC ANCHOR |
|---|---|---|---|---|
| 1 | a-1 | b-1 | c-1 | 20031103T101010Z |
| 2 | | | | |
| 3 | a-3 | b-3 | c-3 | 20031103T101010Z |
| 4 | d-4 | e-4 | f-4 | |
| 5 | a-5 | b-5 | c-5 | 20031101T103210Z |
| 6 | a-6 | b-6 | c-6 | |
| 7 | a-7 | b-7 | c-7 | |
| 8 | a-8 | b-8 | c-8 | |

FIG.4B

| ITEM ID | DATA FIELD | | | SYNC ANCHOR |
|---|---|---|---|---|
| 2 | | | | Delete |
| 4 | d-4 | e-4 | f-4 | Replace |
| 6 | a-6 | b-6 | c-6 | Add |
| 7 | a-7 | b-7 | c-7 | Add |
| 8 | a-8 | b-8 | c-8 | Add |

FIG.4C

| ITEM ID | DATA FIELD | | | SYNC ANCHOR |
|---|---|---|---|---|
| 1 | a-1 | b-1 | c-1 | 20031103T101010Z |
| 2 | | | | |
| 3 | a-3 | b-3 | c-3 | 20031103T101010Z |
| 4 | d-4 | e-4 | f-4 | 20031105T093022Z |
| 5 | a-5 | b-5 | c-5 | 20031101T103210Z |
| 6 | a-6 | b-6 | c-6 | 20031105T093022Z |
| 7 | a-7 | b-7 | c-7 | 20031105T093022Z |
| 8 | a-8 | b-8 | c-8 | 20031105T093022Z |
| 9 | s-9 | i-9 | j-9 | 20031105T093022Z |
| 10 | s-10 | i-10 | j-10 | 20031105T093022Z |

FIG.4D

SYSTEM AND METHOD OF SYNCHRONIZING DATA BETWEEN A SERVER AND A CLIENT

PRIORITY

This application claims priority under 35 U.S.C. §119 to an application entitled "Data Synchronizing System and Method of Synchronizing Data Between Server and Client Using the Same" filed in the Korean Intellectual Property Office on Mar. 5, 2004 and assigned Ser. No. 2004-15035, the contents of which are incorporated herein by reference.

BACKGROUND OF THE INVENTION

1. Field of the Invention

The present invention relates generally to a data synchronizing system and a method of synchronizing data between a server and a client, and in particular, to a method of synchronizing data between a mobile terminal and a server for storing data received from the mobile terminal.

2. Description of the Related Art

Typically, a mobile terminal user saves personal information such as a directory and schedules in the mobile terminal. When the old mobile terminal is replaced with a new one for some reasons such as breakage or loss, information in the old mobile terminal is stored and managed in a separate data storage server so that the new mobile terminal can use the information. To preserve the same information in both the mobile terminal and the data storage server, data synchronization must be carried out if data, on either the mobile terminal or the data storage server has been changed.

Generally, the data synchronization is performed upon request for synchronization from the mobile user.

FIG. 1 is a flowchart illustrating a conventional data synchronizing operation between a server 20 and a client 10. The server 20 corresponds to the data storage server and the client 10 corresponds to the mobile terminal. Referring to FIG. 1, as the client 10 requests data synchronization to the server 20, a sync session is initiated in step S11. The client 10 detects the last anchor (anchors are described below) in existing synchronization information in step S13 and transmits to the server 20 the last anchor and the next anchor that provides time information about the initiation of the current sync session in step S15. The server 20 compares the last anchor stored in the server with the received last anchor of the client 10 in step S17 and notifies the client 10 of the comparison result in step S19.

The client 10 analyzes the comparison result in step S21. If the last anchor of the client 10 is identical to that of the server 20, the client 10 is synchronized to the server 20 and transmits changed information to the server 20. That is, if the last anchors are the same, the client 10 determines whether its change log management database (DB) is normal in step S23. Normal is the status of operating the change log management DB without any error. If it is normal, the client 10 prepares for delivering a change log to the server 20 in step S25.

On the other hand, if the last anchors are different and the change log management DB in the client 10 is not normal, the client 10 prepares to deliver its whole stored information in step S27.

Upon preparation of the information to be delivered to the server 20 in step S25 or S27, the client 10 transmits the prepared information (the whole information or the change log) to the server 20 in step S29. In step S31, the server 20 updates its DB with the received information.

When the synchronization is carried out successfully in steps S11 through S31, the server 20 and the client 10 update their last anchors in steps S33 and S35. That is, they change the next anchor describing the current sync session to the last anchor.

The synchronization between the client 10 and the server 20 though transmission of the whole contents of the DB is called slow sync. The slow sync is performed in the case where the server or client have lost their change log or their last anchors are different, as described above. When the client completely transmits the whole data to the server, the server compares its stored data with the received data field by field and transmits changed data to the client 10. The client 10 then synchronizes its data with the received data.

In the above described conventional synchronization, the server and the client separately manage data, sync anchors, and change logs, and perform synchronization based on these separately managed processes. When their last anchors are different or a change log is lost, a slow sync is carried out including transmission of the whole data.

A distinctive shortcoming of the slow synch is slow speed of processing as compared to a method of transmitting only a change log. Therefore, if the slow sync occurs frequently, a synchronization delay exists between the server and the client.

SUMMARY OF THE INVENTION

An object of the present invention is to substantially solve at least the above problems and/or disadvantages and to provide at least the advantages below. Accordingly, an object of the present invention is to provide a system and method for minimizing the causes of slow sync between a server and a client thereby reducing data synchronization delay factors.

Another object of the present invention is to provide a system and method for increasing synchronization speed by managing the sync anchors and change logs of a server and a client in a simple manner.

The above objects are achieved by providing a data synchronizing system and a data synchronizing method between a server and a client.

According to one aspect of the present invention, the server and the client in the data synchronizing system share data including a sync anchor field for each item and manage information changed after a synchronization using the database.

According to another aspect of the present invention, in the data synchronizing method, the server and the client manage data changed after a previous synchronization of a database. The database includes a sync anchor field for each data item. When a sync session is initiated upon the client's request, a last anchor is detected in the database stored in the client and a last anchor from the database stored in the server. The last anchor of the client's database is compared with the last anchor of the server's database. A client change log and a server change log are generated according to a comparison result based on a database change that occurred after the last anchor of the client's or the server's database when the last anchor of the client's database is identical to the last anchor of the server's database. The databases stored in the server and the client are updated according to the client's change log and the server's change log.

BRIEF DESCRIPTION OF THE DRAWINGS

The above and other objects, features and advantages of the present invention will become more apparent from the following detailed description when taken in conjunction with the accompanying drawings in which:

FIG. 2 is a diagram of a field structure of a database, which is used to implement a data synchronizing method according to an embodiment of the present invention;

FIGS. 4A to 4D are diagrams illustrating data items of database states during data synchronization between the server and the client according to the present invention.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 2:
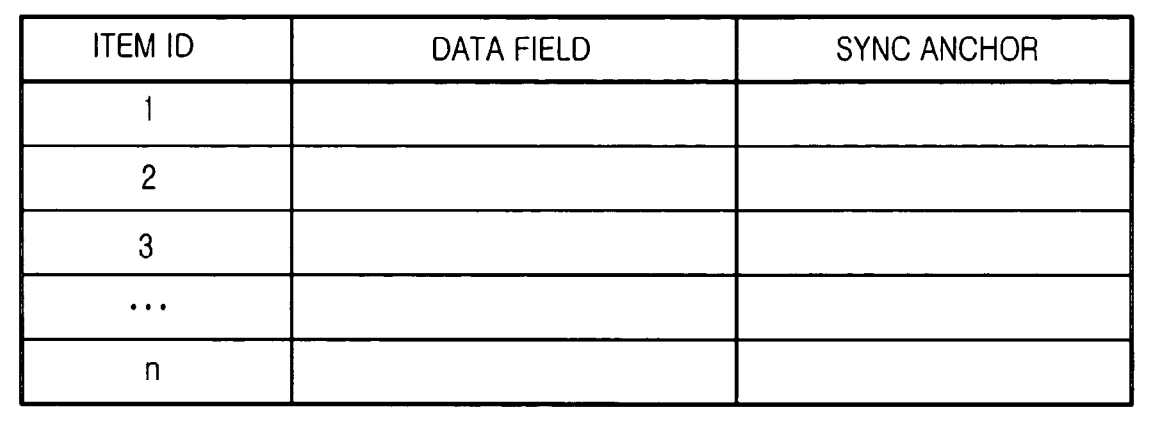

FIG. 2 illustrates the field structure of a database (DB), which is used to implement a data synchronizing method according to an embodiment of the present invention. Referring to FIG. 2, the DB includes an Item ID field, a Data field, and a Synch Anchor field. That is, the DB manages data for each item and a synch anchor associated with the data.

For example, if the DB using the structure illustrated in FIG. 2 is used to manage a phone book, identification (ID) numbers that identify persons are filled under the Item ID field, the phone numbers of the persons (e.g., the phone numbers of homes or offices, or mobile phone numbers) are saved under the Data field, and corresponding synchronization time information is stored under the Sync Anchor field. The synchronization time information is the last anchor that describes time when the last synchronization occurs between the server and the client. If data corresponding to an item is changed or deleted after the last synchronization, or if an item is added, information in Sync Anchor field is deleted to thereby notify that the item is not synchronized, that is, it is a change log.

Figure 1:
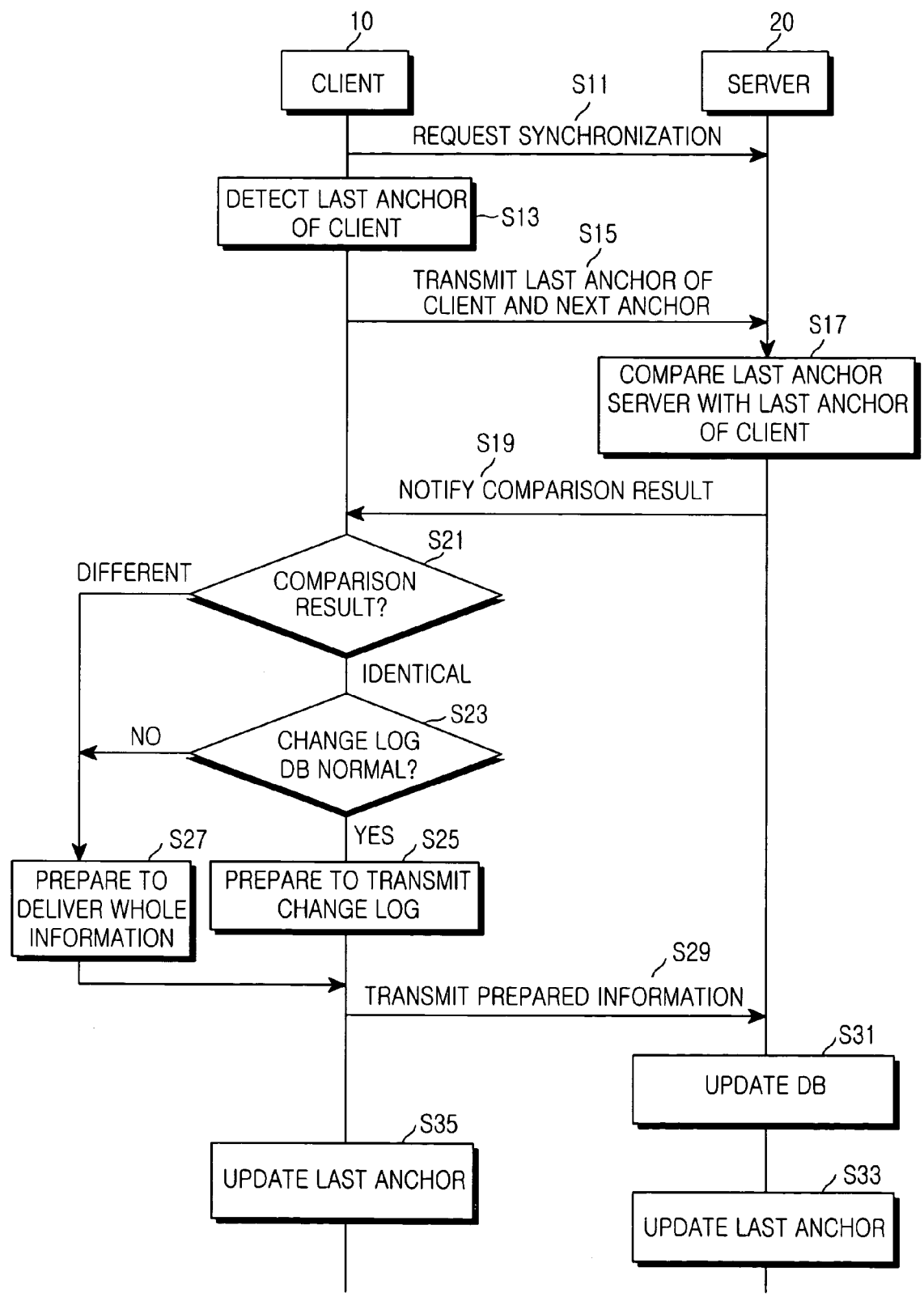
FIG. 1 is a flowchart illustrating a conventional data synchronizing method between a server and a client.
Figure 3:
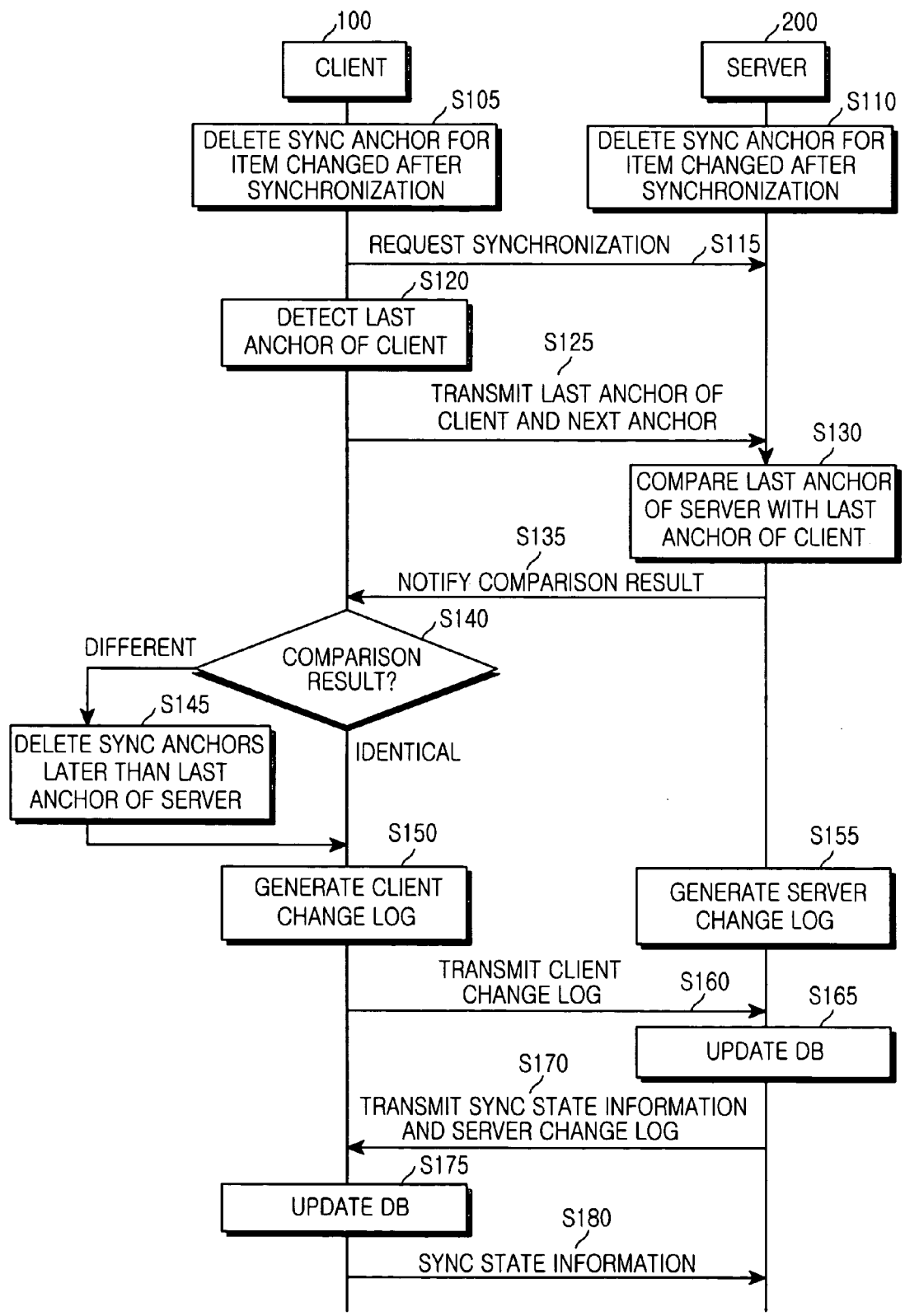
FIG. 3 is a flowchart illustrating the data synchronizing method between a server and a client in a data synchronizing system according to the embodiment of the present invention.

FIG. 3 is a flowchart illustrating a method for synchronizing data between a server 200 and a client 100 in a data synchronizing system according to the embodiment of the present invention. Referring to FIG. 3, in steps S105 and S110 the server 200 and the client 100, which store/manage predetermined data such as a directory, a phone book, and schedules in a DB having the above-described field structure, delete the sync anchor of an item which has been changed since the last synchronization.

In step S115 the client 100 requests synchronization from the server 200 and thus, a sync session is initiated. In step S120 the client 100 detects the last anchor from its DB. That is, the client 100 searches for the last (e.g., according to the time stamp) of sync anchors of the DB. Typically, since a sync anchor having the greatest value is the last anchor, the client 100 searches for one of the sync anchors that has the greatest value.

In step S125 the client 100 transmits the last anchor of client and the next anchor indicating the stating time of the current session to the server 200. The server 200 in step S130, then compares the last anchor stored in its DB with the received client's last anchor and notifies the client 100 of the comparison result in step S135. Preferably, the server 200 detects its last anchor in the same manner as the client 100 does. That is, it searches the DB for a sync anchor having the greatest value. If the server's last anchor is identical to the client's last anchor, the server 200 transmits a message indicating that they are identical, for example, "OK" to the client 100.

On the other hand, if the server's last anchor is different from the client's last anchor, the server 200 determines which last anchor has the larger value. If the server's last anchor is larger, the server 200 deletes all sync anchors larger than the client's last anchor in order to change the server's last anchor to the client's last anchor. The server 200 then transmits the "OK" message to the client 100, notifying that the last anchors are identical. If the client's last anchor is larger, the server 200 transmits to the client 100 a message indicating that the last anchors are different, for example "NOK".

The client 100 checks the comparison result in step S140. If the comparison result is "OK", the client 100 detects items whose sync anchors have been deleted and generates a client change log in step S150. That is, the server's last anchor is identical to the client's last anchor, the client 100 generates the client change log from the DB structured illustrated in FIG. 2.

If, however, the comparison result is "NOK", in step S145 the client 100 deletes sync anchors indicating time later than the last anchor of server. That is, the client 100 then performs step S150. In step S160, the client 100 transmits the client change log to the server 200.

Meanwhile, the server 200 generates a server change log in step S155. That is, the server 200 detects items whose sync anchors have been deleted in its DB, having the structure illustrated in FIG. 2, and generates the server change log.

After updating the DB based on the received client change log in step S165, in step S170 the server 200 transmits sync state information indicating normal synchronization based on the client change log, and the server change log to the client 100.

After updating the DB based on the received server change log in step S175, in step S180 the client 100 transmits to the server 200 sync state information indicating the normal synchronization based on the server change log.

The DB update steps S165 and S175 of the server 200 and the client 100 include updating the sync anchor of a corresponding item along with item change information (e.g., change, delete and add). That is, the next anchor indicating the stating time of the current sync session is set as the sync anchor of the item.

FIGS. 4A to 4D illustrate DB states during data synchronization between the server and the client according to the present invention. FIG. 4A illustrates the states of the server DB and the client DB before a new sync session is initiated. Referring to FIG. 4A, each DB manages the last anchor for each item according to the embodiment of the present invention. The DB illustrated in FIG. 4A has "20031101T103210Z" as the last anchor.

FIG. 4B illustrates a change in the DB illustrated in FIG. 4A after data synchronization. Referring to FIG. 4B, the DB has been changed after the last anchor of "20031101T103210Z". Specifically, item 2 has been deleted, item 4 has been changed (from a-4, b-4 and c-4 to d-4, e-4 and f-4, respectively), and items 6, 7 and 8 have been added.

FIG. 4C illustrates a change log based on the DB illustrated in FIG. 4B. Referring to FIG. 4C, the change log indicates the change of the DB illustrated in FIG. 4A after the last anchor of 20031101T103210Z: deletion of item 2, replacement of item 4, and addition of items 6, 7 and 8).

FIG. 4D illustrates a DB state after a new synchronization is carried out at 20031105T093022Z. When the DB illustrated in FIG. 4A, which was stored in the client and the server after the last anchor of 20031101T103210Z, has been changed in the client as illustrated in FIGS. 4B and 4C and has been added with item 9 having s-9, i-9 and j-9 and item 10 having s-10, i-10 and j-10 in the server, data synchronization is carried out between the server and the client at 20031105T093022Z by the change log illustrated in FIG. 4C and addition of the server items, resulting the DB illustrated in FIG. 4D.

In accordance with the present invention, a Sync Anchor field is added and managed for each item in the DBs on a server and a client. The resulting minimization of factors causing slow sync between the server and the client reduces data synchronization delay factors. Also, the present invention enables simple management of sync anchors and change logs of the server and the client, thereby simplifying synchronization between them and increasing synchronization speed.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of synchronizing data between a server and a client, wherein the data is stored in databases residing on a plurality of a server and a client computing devices, the method comprising the steps of:

(1) managing data, which has been changed after a previous synchronization in a database where data is shared by the server and the client, the database including a sync anchor field for each data item, and deleting data in the sync anchor field of a data item which has been changed after the synchronization;

(2) detecting a last anchor from the database stored in the client and a last anchor from the database stored in the server;

(3) comparing the client's last anchor with the server's last anchor;

(4) generating a client change log and a server change log according to a comparison result based on a database change that occurred after the client's or server's last anchor when the client's last anchor is identical to the server's last anchor, and generating the server change log and the client change log using information about items of which the last anchors have been deleted in the databases stored in the server and the client; and (5) updating the databases on the client and the server according to the client change log and the server change log.

2. The method of claim 1, wherein each data item of the databases includes:

an item identification (ID) number field;
   a data field for storing data for an item; and
   the sync anchor field indicating the last anchor of the data.

3. The method of claim 1, wherein step (2) further comprises the step of detecting the largest sync anchor field values in the databases stored on the server and the client as the server's last anchor and the client's last anchor, respectively.

4. The method of claim 3, wherein step (4) further comprises:

changing the client's last anchor to the server's last anchor if the client's last anchor is larger; and
   deleting last anchors larger than the changed last anchor in the client database.

5. The method of claim 3, wherein step (4) further comprises the:

changing the server's last anchor to the client's last anchor if the server's last anchor is larger; and
   deleting last anchors larger than the changed last anchor in the server database.

6. The method of claim 1, wherein step (5) further comprises changing sync anchors for items changed in each of the databases using the next anchor describing the initiation of the sync session.

7. The method of claim 1, wherein step (2) further comprises the step of the client initiating a synchronization session with the server by issuing a request for data synchronization.

8. A data synchronizing system comprising:

a server device for sharing data with a client device, the data having fields including a sync anchor field for each data item, and managing changed data in a database after synchronization; and
   the client device for sharing the data with the server device, the data having fields including the sync anchor field for each data item, and managing the changed information in the database after the synchronization:,
   wherein data in the sync anchor field of a data item which has been changed is deleted after the synchronization, and
   wherein a server change log and a client change log are generated using information about items of which the last anchors have been deleted in the databases stored in the server and the client.

9. The data synchronizing system of claim 8, wherein the data further includes:

an item identification (ID) number field;
   a data field for storing data for an item; and
   the sync anchor field indicating the last anchor of the data.

10. The data synchronizing system of claim 8, wherein when a sync session is initiated upon request of the client, the client and the server respectively detect a last anchor from the database stored in the client and a last anchor from the database stored in the server,
   compare the last anchor of the client with the last anchor of the server, and
   update the database of the client or the server according to the client or the server change log.

11. The data synchronizing system of claim 10, wherein if the last anchor of the client is different from the last anchor of the server, the client and the server detect the last anchor of the client or the server that is identical to the last anchor of the server or the client,
   delete last anchors larger than the detected last anchor, and
   perform data synchronization using the detected last anchor as the last anchor for the data synchronization.

* * * * *